US008023116B1

(12) United States Patent
Zumberge et al.

(10) Patent No.: US 8,023,116 B1
(45) Date of Patent: Sep. 20, 2011

(54) RESOLVING QUADRATURE FRINGES OF INTERFEROMETER SIGNALS IN REAL TIME

(75) Inventors: Mark A. Zumberge, San Diego, CA (US); Jonathan Berger, San Diego, CA (US); Robert L. Parker, San Diego, CA (US); Matthew Dzieciuch, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 1148 days.

(21) Appl. No.: 11/754,963

(22) Filed: May 29, 2007

Related U.S. Application Data

(63) Continuation of application No. 11/030,596, filed on Jan. 5, 2005, now Pat. No. 7,224,463.

(60) Provisional application No. 60/534,611, filed on Jan. 5, 2004.

(51) Int. Cl.
*G01B 9/02* (2006.01)
(52) U.S. Cl. ....................................................... 356/450
(58) Field of Classification Search .................. 356/450
See application file for complete search history.

(56) References Cited

U.S. PATENT DOCUMENTS

| | | | | |
|---|---|---|---|---|
| 5,450,196 | A * | 9/1995 | Turner | 356/453 |
| 7,224,463 | B1 * | 5/2007 | Zumberge et al. | 356/450 |
| 2002/0064233 | A1 * | 5/2002 | Terreault et al. | 375/261 |
| 2005/0027489 | A1 * | 2/2005 | Kasevich et al. | 702/189 |

OTHER PUBLICATIONS

Peter Heydemann, *Determination and correction of quadrature fringe measurement errors in interferometers*, Oct. 1, 1981, Applied Optics, vol. 20, No. 19, pp. 3382-3384.
Jeff Bush, et al., *Multi-channel Interferometric Demodulator*, May 6, 1997, Third Pacific Northwest Fiber Optic Sensor Workshop, SPIE vol. 3180.
P.G. Davis, et al., *Fiber Optic Displacement Sensor*, May 6, 1998, Fourth Pacific Northwest Fiber Optic Sensor Workshop, SPIE vol. TBD.
TaeBong Eom, et al., *The Dynamic Compensation of Nonlinearity in a Homodyne Laser Interferometer*, 2001, Measurement Science and Technology 12, pp. 1734-1738.
Mark Zumberge, et al., *An Optical Fiber Infrasound Sensor: A New Lower Limit on Atmospheric Pressure Noise Between 1 and 10 Hz*, May 2003, J. Acoust. Soc. Am 113, pp. 2474-2479.

* cited by examiner

*Primary Examiner* — Patrick J Connolly
(74) *Attorney, Agent, or Firm* — Perkins Coie LLP

(57) ABSTRACT

Techniques and devices for digitally resolving quadrature fringe signals from interferometers such as optical interferometers and interferometer-based sensing devices. In one implementation, two quadrature fringe signals from an interferometer which causes two signals in two signal paths to interfere with each other are sampled to obtain digital data samples from the two quadrature fringe signals. The digital data samples are used to perform a linear least square fitting to establish coefficients for an ellipse traced by the two quadrature fringe signals as a phase difference between the two signal paths changes. A pair of digital data samples are respectively obtained from the two quadrature signals at a given moment and are used to compute a corresponding phase difference between the two signal paths of the interferometer from established coefficients of the ellipse. The coefficient for the ellipse can be updated over time. This digital processing allows for real time processing.

20 Claims, 5 Drawing Sheets

RESOLVING QUADRATURE FRINGES OF INTERFEROMETER SIGNALS IN REAL TIME

RELATED APPLICATION

The present patent application is a continuation of U.S. patent application Ser. No. 11/030,596 filed on Jan. 5, 2005 now U.S. Pat. No. 7,224,463 and entitled "RESOLVING QUADRATURE FRINGES OF INTERFEROMETER SIGNALS IN REAL TIME" which claims the benefit of priority from commonly-owned U.S. Provisional Patent Application No. 60/534,611 filed on Jan. 5, 2004, entitled "RESOLVING QUADRATURE FRINGES IN INTERFEROMETER SIGNALS."

The entire disclosures of above referenced patent applications are incorporated by reference as part of the specification of this application.

FEDERALLY SPONSORED RESEARCH OR DEVELOPMENT

The research and development for inventions described in this application received funding under Grant No. DTRA01-99-C-0056 from the Defense Threat Reduction Agency. The U.S. Government may have rights to various technical features described in this application.

BACKGROUND

This application relates to interferometers and processing of signals from interferometers.

Interferometers may be used to extract useful information from interference of two signals. Interferometers may be implemented in various forms, including electronic and optical interferometers. In electronic interferometers, two electronic signals are interfered with each other to produce the interferometer signals for processing. Optical interferometers use interference of two spatially overlapped optical signals to produce an optical interference field which is detected and processed for extracting desired information.

SUMMARY

This application describes interferometer devices and techniques for efficiently resolving quadrature fringes with a high resolution using digital signal processing.

In one implementation, two quadrature fringe signals from an interferometer which causes two signals in two signal paths to interfere with each other are sampled to obtain digital data samples from the two quadrature fringe signals. The digital data samples are used to perform a linear least square fitting to establish coefficients for an ellipse traced by the two quadrature fringe signals as a phase difference between the two signal paths changes. A pair of digital data samples are respectively obtained from the two quadrature signals at a given moment and are used to compute a corresponding phase difference between the two signal paths of the interferometer from established coefficients of the ellipse. The coefficient for the ellipse can be updated over time. This digital processing allows for real time processing.

In another implementation, an interferometer device may include an interferometer to produce an interferometer signal indicative of interference of two signals, a quadrature fringe signal generator to produce two fringe signals in quadrature, and a digital signal processor that processes the two quadrature fringe signals. The relative phase of the two quadrature fringe signals depends on the sign of the time rate of change in the difference between the signal paths of the two signals in the interferometer, e.g., the difference in the optical paths of two optical signals in an optical interferometer. The two quadrature fringe signals are digitized and analyzed in real time in the digital signal processor to yield a linear, high resolution, wide dynamic range displacement transducer. For example, when the interferometer in this implementation is a Michelson optical interferometer, the above system may be used to achieve a resolution of about $5 \times 10^{-13}$ m Hz$^{-1/2}$ at 2 Hz with a dynamic range of several centimeters or more.

The quadrature fringe signal generator in one implementation may include a signal splitter to split the interferometer signal into a first interferometer signal as the first quadrature fringe signal and a second interferometer signal. The second interferometer signal is processed to produce a phase shift of 90 degrees as the second quadrature fringe signal. The two quadrature fringe signals are converted into digital signals for processing by the digital signal processor. When the interferometer is an optical interferometer, the optical interferometer signal produced from interference of two optical signals may be optically split into two optical interferometer signals to two optical detectors where one optical detector output may be phase shifted for 90 degrees to produce two quadrature fringe signals. Alternatively, a single optical detector may be used to convert the optical interferometer signal into an electrical interferometer signal which is split into two electrical interferometer signals. One signal is then phase shifted by 90 degrees.

The digital signal processor may be configured to process the two quadrature fringe signals to construct an ellipse. The coefficients of the constructed ellipse are used to digitally extract the variation in the difference of the signal paths of two signals in the interferometer. In one implementation, the digital signal processor is configured to obtain the fitting equation for the ellipse in nonparametric form and use linear least square fit to find the coefficients of the ellipse. This processing can be efficient and be completed in a relatively short time to achieve nearly real-time processing of quadrature fringe signals.

For example, the processing in the digital signal processor may be implemented to perform the following operations. The quadrature fringe signals are sampled and converted into floating point values. Adjacent samples are monitored to account for phase wraps. Transitions across a phase value of zero are adjusted by a value of either +180 degrees or −180 degrees to achieve a wide dynamic range. The single-sample phase resolution is $\frac{1}{2}^{N-1}$, where N is the number of bits in the digitizers.

These and other implementations are described in greater detail in the drawings, the detailed description, and the claims.

DETAILED DESCRIPTION

Figure 1:
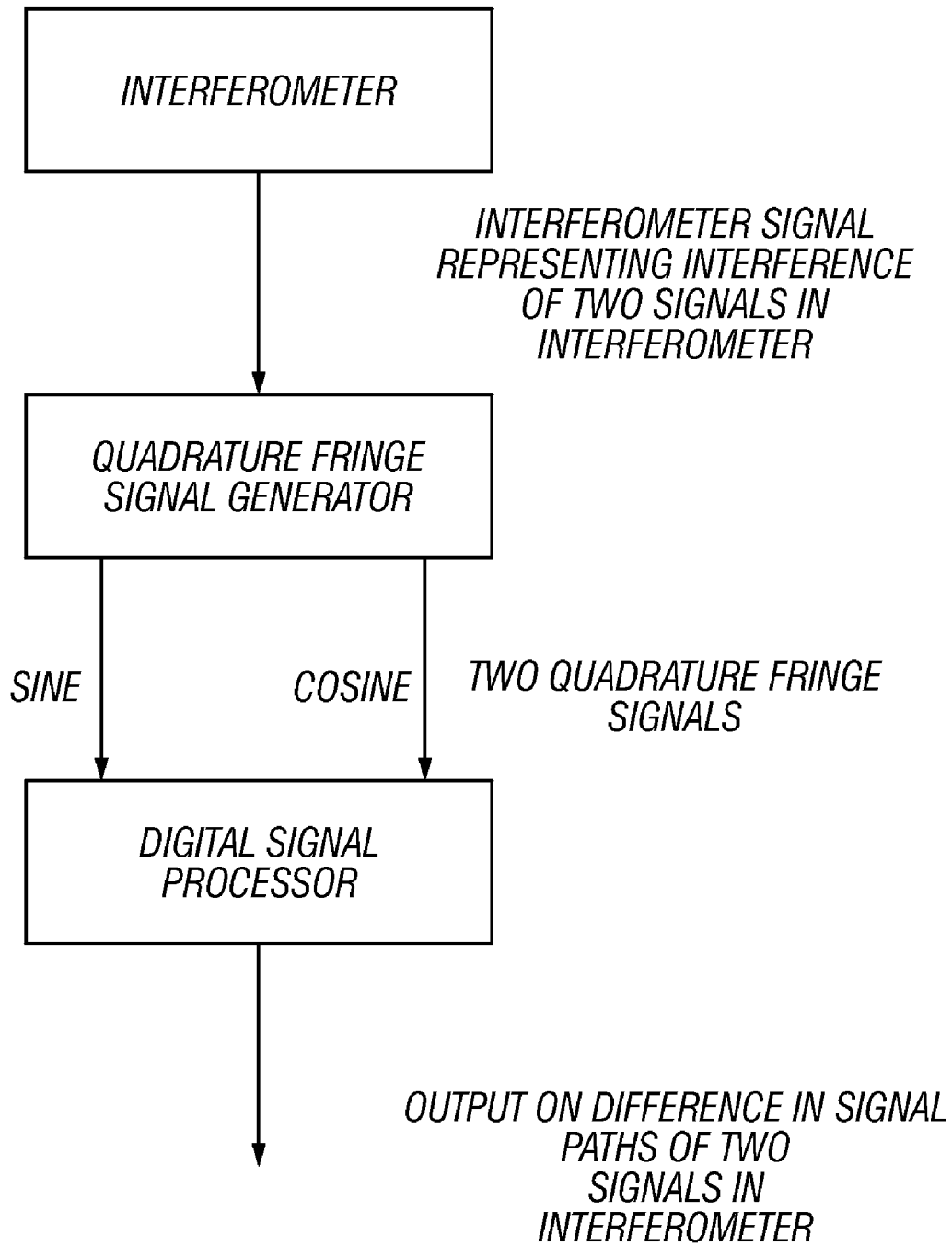
FIG. 1 illustrates an interferometer device with digital processing for resolving quadrature interference fringes according to one implementation, where the interferometer may be an optical interferometer, an electronic interferometer, or other interferometers.

FIG. 1 illustrates one implementation of an interferometer with a digital signal processor for digitally resolving quadrature fringes. The device includes an interferometer to produce an interferometer signal indicative of interference of two signals, a quadrature fringe signal generator to produce two fringe signals in quadrature, and a digital signal processor that processes the two quadrature fringe signals. The relative phase of the two quadrature fringe signals depends on the sign of the time rate of change in the difference between the signal paths of the two signals in the interferometer, e.g., the difference in the optical paths of two optical signals in an optical interferometer. The two quadrature fringe signals are digitized and analyzed in real time in the digital signal processor to yield a linear, high resolution, wide dynamic range displacement transducer. Interferometers may be implemented in various forms, including electronic and optical interferometers. In the following description, optical interferometers are described as examples to illustrate various features and operations of the device in FIG. 1.

Optical interferometry, widely used to quantify observables ranging from displacement to pressure, sometimes suffers from the relative coarseness of the wavelength of light. An interferometer in which displacement is monitored by counting fringes resolves only 0.6 μm if a HeNe laser is used as the source. Of course, in many applications, fringes can be finely divided electronically, but there is often a sacrifice in other aspects of the system, such as dynamic range, directionality, presence of dead-bands (e.g., in a Fabry-Perot), or the need for feedback to the system under test to provide stabilization of the interferometer to a "quadrature" point.

In optical interferometry, the optical length difference between two routes along which coherent light travels is measured through the interference. When combined, the two optical waves interfere and generate "fringes," which are variations in the intensity of the combined light when it strikes a photo-detector. In various optical interferometers, the variation of intensity I varies sinusoidally with the difference in optical path lengths $\Delta x_{op}$ according to:

$$I = I_0 + a\sin\left[\frac{2\pi}{\lambda}\Delta x_{op}\right]$$

The above variation of the intensity with the optical path length difference does not have a one-to-one mapping relationship. The change in I that results from a change in $\Delta x_{op}$ is ambiguous in direction information because the arcsine function is multi-valued. The information on the direction of the change can be obtained from a second source of information. For example, a second fringe signal in quadrature to the original. The directionality may be obtained by electronically generating a quadrature signal. In one implementation, the derivative of the direct fringe signal may be calculated by using a phase-sensitive detector such as a lock-in amplifier to process the direct fringe signal. The lock-in amplifier in this implementation operates as an analog computer which calculates the derivative of the input signal. Since the derivative signal is approximately 90 degrees out of phase with the original fringe signal, the recording the fringe signal and its derivative allows for tracking of both the magnitude and the sign of optical path changes (which are proportional to pressure changes or changes in a selected parameter under monitor).

The direct fringe signal x and the quadrature signal y are two sinusoids that are, in general, of different amplitudes and not exactly 90° out of phase. The quadrature signals x and y track an ellipse when plotted against each other. The resultant ellipse provides the directional information. At a given instant in time, an x-y output is a point on the ellipse. As the optical path increases (decreases), the point moves clockwise (counterclockwise) along the perimeter of the ellipse. The angular position or phase p of the point on the ellipse is linearly related to the change in the different optical signal paths. This change may be used to measure a variation in pressure, temperature or other parameters that cause the change in the difference of the optical paths of the optical interferometer. This use of the angular position or phase p of the point on the ellipse allows the measurement of the change in the optical path change of the optical interferometer to be measured accurately with much higher resolution than the conventional counting of optical fringes. Notably, the present digital processing allows for the accurate measurement of the angular position or phase p of the point on the ellipse to be carried out in nearly real time.

Two exemplary optical interferometer sensors are described below to provide, among other features, both wide dynamic range and high resolution in optical path length change. One sensor is a seismometer, in which the displacement of a mass on a spring is monitored with a free-space Michelson interferometer. The other sensor is a fiber optic pressure sensor in which pressure induced strain in an optical fiber is monitored with a Mach-Zehnder interferometer. See, e.g., Zumberge et al. in "An optical fiber infrasound sensor: A new lower limit on atmospheric pressure noise between 1 and 10 Hz," J. Acoust. Soc. Am. 113, 2474-2479 (2003). In both sensors, the resolution in displacement can be of a few picometers along with the ability to follow displacements that may span many millimeters. A digital signal processor (DSP) based fringe resolver is used to achieve the above operation with novel processing techniques. Two fringe signals that are approximately in quadrature are input to a fast A/D converter. An algorithm in the DSP samples the quadrature fringe signals and continually updates the parameters of an ellipse that characterizes the fringe pattern while instantaneously computing the optical phase. A resolution of $5\times10^{-13}$ m $Hz^{-1/2}$ was obtained at 2 Hz. The real-time aspect of this method produces important advantages over similar methods such as those described by Eom et al. in "The dynamic compensation of nonlinearity in a homodyne laser interferometer," Meas. Sci. Technol. 12, 1734-1738 (2001) and by Heydemann in "Determination and correction of quadrature fringe measurement errors in interferometers," Applied Optics 20, 3382-3384 (1981).

Figure 2A:
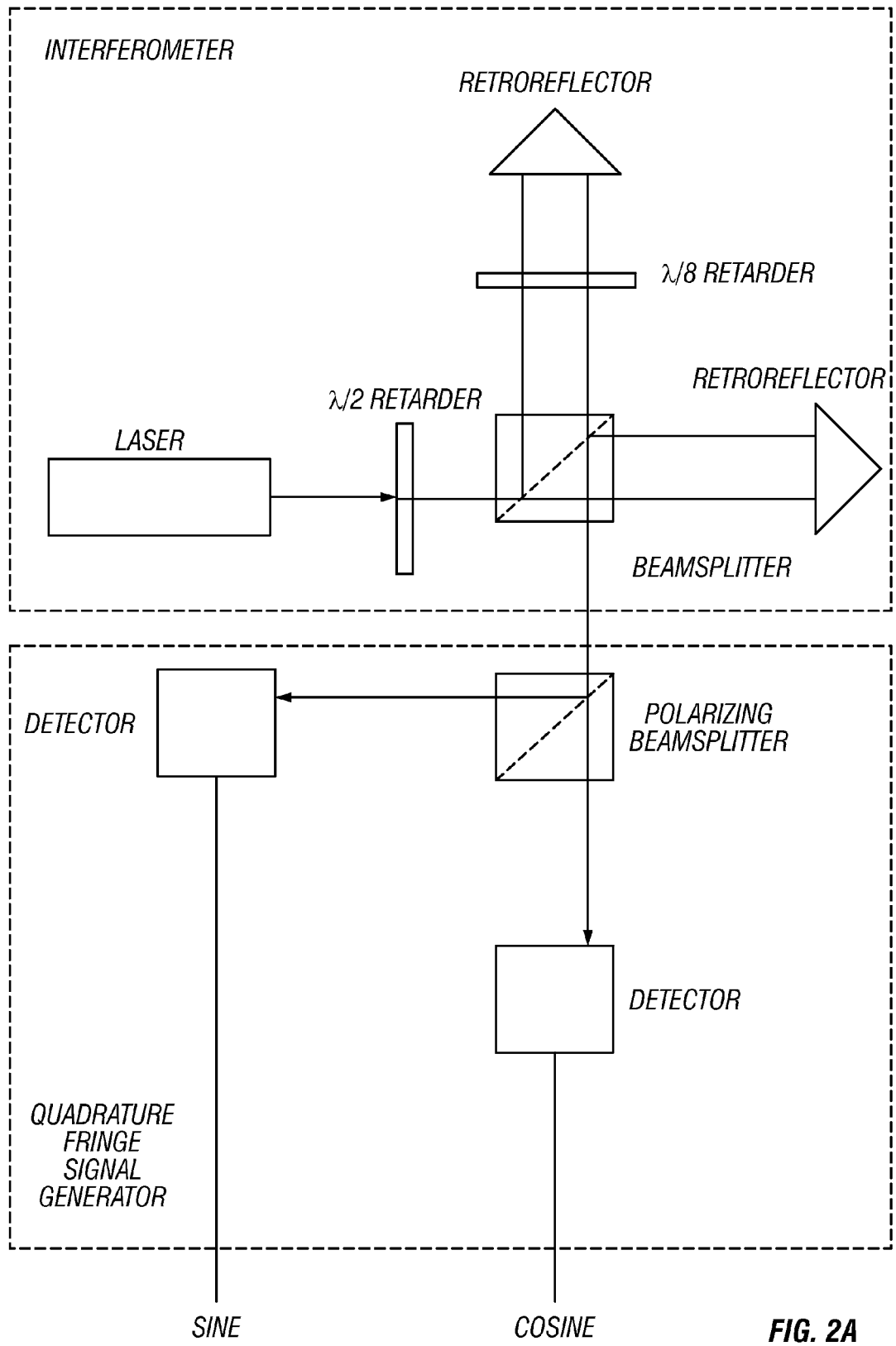
FIG. 2A shows an exemplary optical implementation of the device in FIG. 1 where a Michelson optical interferometer is used as the interferometer in which one of the arms is lengthened by a quarter of a wavelength for one polarizations state and a polarizing beamsplitter separates the two fringe signals yielding a quadrature output.
Figure 2B:
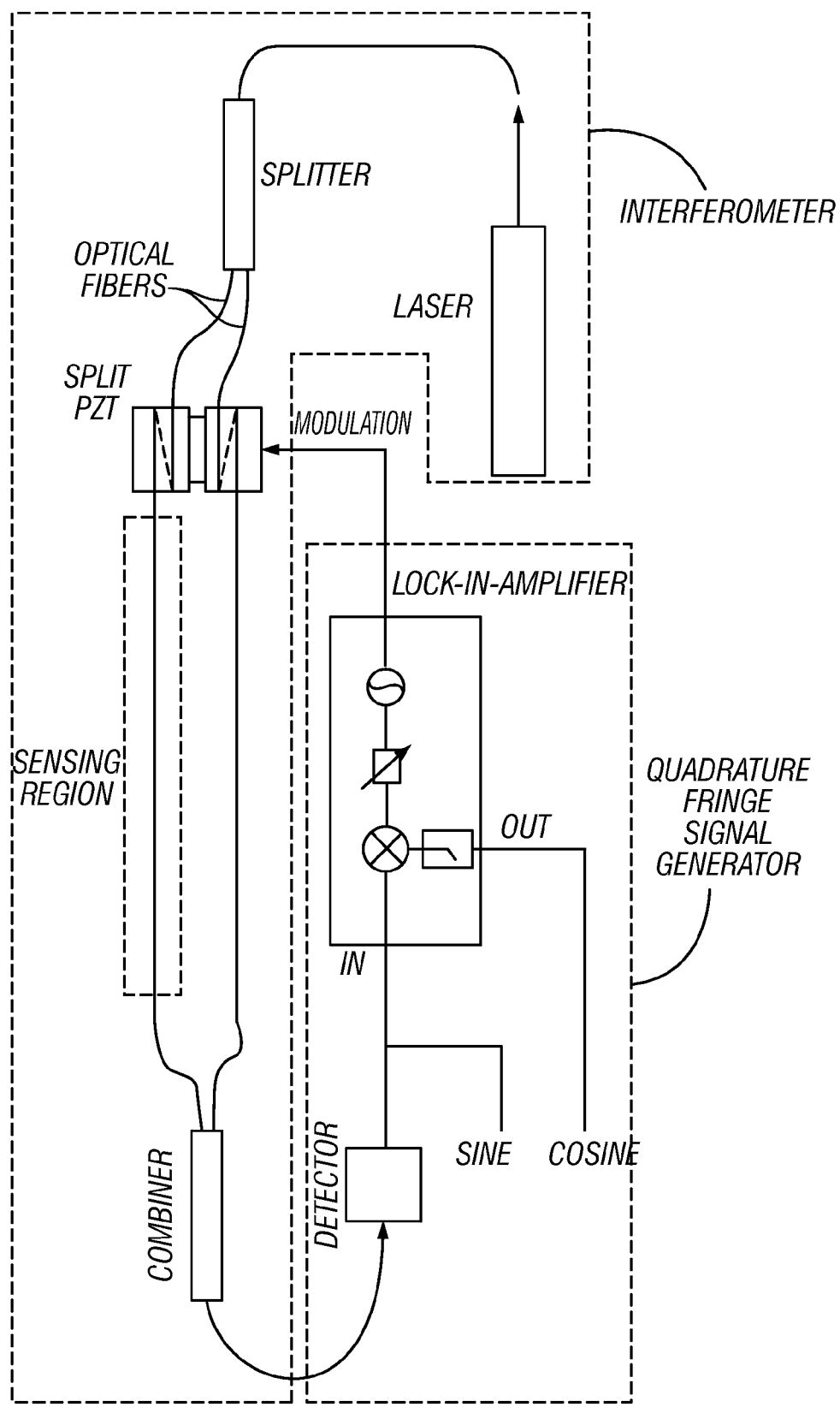
FIG. 2B shows another exemplary optical implementation of the device in FIG. 1 where a Mach-Zehnder interferometer is formed with optical fibers and a quadrature output is generated with analog electronics by differentiating the fringe signal with a lock-in amplifier. A split PZT modulator modulates the two arm lengths 180° out of phase with each other.

FIGS. 2A and 2B illustrate two examples of optical interferometers with quadrature fringe signals suitable for the present digital processing of the optical fringes.

FIG. 2A shows a simple Michelson interferometer modified to produce two fringe signals that are in quadrature. A birefringent element (a π/8 phase retarder) in one of the two arms lengthens the optical path for one polarization by λ/4 in one round trip. Illuminating the interferometer with both polarizations (by adjustment of a λ/2 phase retarder before the beamsplitter) and separating the two fringe signals with a polarizing beamsplitter produces the sine and cosine components of the optical phase difference.

FIG. 2B shows a Mach-Zehnder interferometer made of optical fibers to produce sinusoidal fringes. The two arms of this particular interferometer are implemented with two piezoelectric modulators which are modulated out of phase by about 0.01 fringe at 156 kHz to produce quadrature fringe signals. The output of the photodetector x is input to a lock-in amplifier which demodulates the fringe signal at the same frequency to generate an output y that is proportional to the spatial derivative of the fringe signal:

$$y \propto \frac{\partial x}{\partial L}$$

Like the device in FIG. 2A, the two fringe signals x and y so obtained in FIG. 2B trace out an ellipse as the optical path difference L changes.

Imperfections in both systems make the ellipse shape somewhat variable in time. For example, polarization drift in the fiber for the case of the optical fiber interferometer, and optical alignment in the case of the free-space Michelson, may account for gradual evolution of the shape of the ellipse. The goal of the DSP is to compute the optical phase p continually from samples of x and y given the parametric equations:

$$x = x_0 + a \sin(p + p_0) \quad (1)$$

$$y = y_0 + b \cos p \quad (2)$$

where x and y are the two voltage outputs from the detectors, a and b are the amplitudes of the two fringe signals, $x_o$ and $y_o$ are the offsets, and $p_o$ is a constant phase offset from imperfections in electro-optic system (the fringe signals do not have to be exactly in quadrature).

Figure 3:
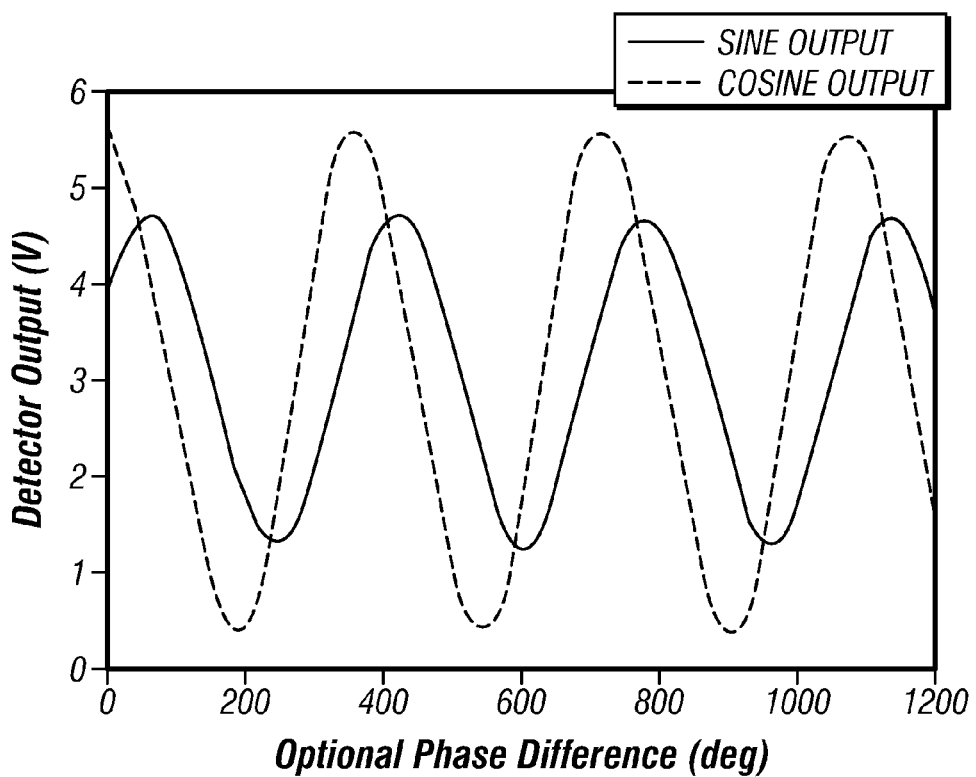
FIG. 3 illustrates examples of quadrature fringe signals as a function of the optical phase difference of the two optical arms in an optical interferometer.
Figure 4:
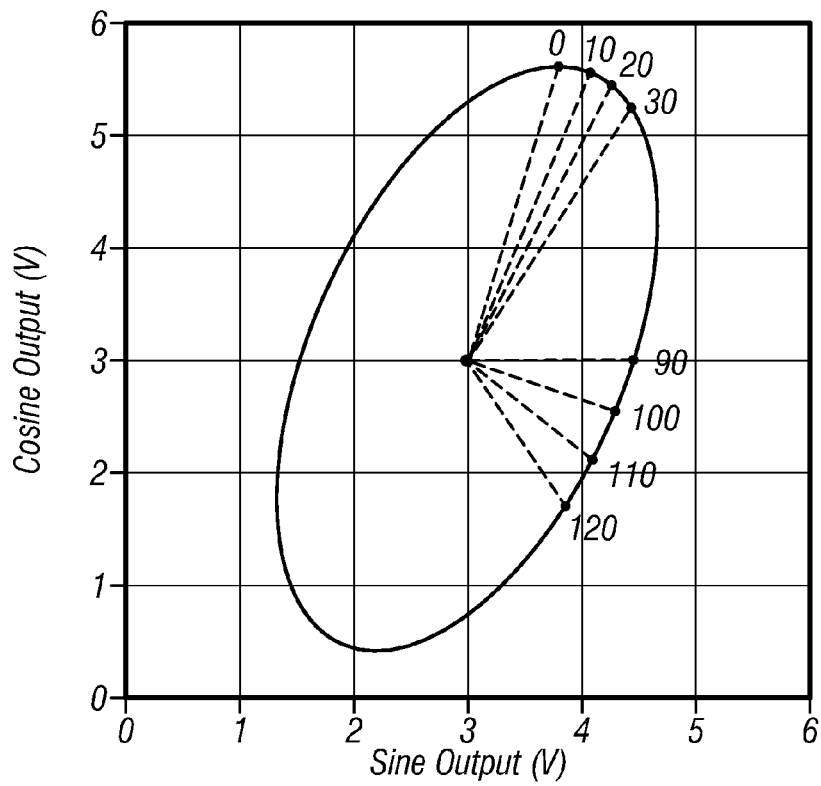
FIG. 4 illustrates an ellipse by plotting the quadrature fringe signals in FIG. 3 against each other.

FIGS. 3 and 4 illustrate the behaviors of the two photodetector output voltages x and y as the optical path difference L changes. FIG. 3 shows examples of quadrature fringe signals x and y for $x_o = y_o = 3$, $a = 1.7$, $b = 2.6$, and $p_o = 30°$. FIG. 4 shows the ellipse traced by the x and y in FIG. 3 as the optical phase difference L changes. Increasing (decreasing) the path length difference causes the x-y ordered pair at any instant to move clockwise (counterclockwise) around the ellipse. The digital processing is used to solve for the phase angle of the position on the ellipse. At any instant in time, the optical phase p can be found from the position as an x-y voltage pair on the ellipse. This position and the value in degrees are indicated for several values of p. The DSP continually fits a recent collection of x-y pairs for the five ellipse parameters via a least square fitting, and uses the fitted ellipse parameters to compute p from each new x-y pair.

The digital processing is to rapidly sample x and y at a speed faster than the highest expected fringe rate, and save a recent collection of x-y pairs to which we occasionally fit an ellipse described by the five unknown parameters $x_o$, $y_o$, a, b, and $p_o$. Then for each new sample of x and y, the associated instantaneous phase p can be computed. If the passage of several fringes can be counted during the period over which the data is collected for the ellipse fit, the ellipse coefficients can be continually updated. If the physical system is such that a whole fringe passes by very slowly, then the system can be modulated to ensure adequate sampling to describe an ellipse. A digital signal processor (DSP) can be coded to perform these computations and to provide a real-time, high-precision fringe resolver.

The following describes the least square fitting of the ellipse. The x and y data from the detectors can be fitted to the parametric equations (1) and (2) with non-linear least squares. This approach, however, may slow down the processor while an unpredictable number of iterations may be needed for convergence. The digital processing described in the following example instead is designed to obtain the equation for the ellipse in a nonparametric form by eliminating p from these equations. This allows for the use of the linear least square fitting to find the ellipse coefficients.

Two dimensionless variables are introduced for convenience:

$$u \equiv \frac{x - x_0}{a}, \quad v \equiv \frac{y - y_0}{b} \quad (3)$$

Hence, Eqs. (1) and (2) can be written as follows:

$$u = \sin(p + p_0) = \sin p \cos p_0 + \cos p \sin p_0 \quad (4)$$

$$v = \cos p \quad (5)$$

Eq. (5) can be used in (4) to eliminate p:

$$u = \sqrt{1 - v^2} \cos p_0 + v \sin p_0 \quad (6)$$

which is an equation for the ellipse. Eq. (6) can be re-written to eliminate the root and make it recognizable:

$$(1 - v^2) \cos^2 p_0 = (u - v \sin p_0)^2 \quad (7)$$

Rearranging the above equation yields the following:

$$u^2 + v^2 - 2uv \sin p_0 - \cos^2 p_0 = 0 \quad (8)$$

Now reintroduce the original variables from Eq. (3), the following can be derived:

$$\frac{(x - x_0)^2}{a^2} + \frac{(y - y_0)^2}{b^2} - \frac{2(x - x_0)(y - y_0)\sin p_0}{ab} = \cos^2 p_0 \quad (9)$$

which leads to:

$$\frac{x^2}{a^2} + \frac{y^2}{b^2} - \frac{2xy \sin p_0}{ab} - 2x\left[\frac{x_0}{a^2} - \frac{y_0 \sin p_0}{ab}\right] - 2y\left[\frac{y_0}{b^2} - \frac{x_0 \sin p_0}{ab}\right] = \cos^2 p_0 - \left[\frac{x_0^2}{a^2} + \frac{y_0^2}{b^2} - \frac{2x_0 y_0 \sin p_0}{ab}\right] \quad (10)$$

The expression in Eq. (10) can be compared to the general quadratic form for an ellipse described by the following equations:

$$\alpha_1 x^2 + \alpha_2 y^2 + \alpha_3 xy + \alpha_4 x + \alpha_5 y = \alpha_6 \quad (11)$$

Eq. (10) has five unknowns: a, b, $x_o$, $y_o$, and $p_o$. In Eq. (11), there are apparently six coefficients, but in fact only their ratios can be found from fitting, since the equation is homogeneous. The traditional way to solve a homogeneous system like Eq. (11) is to impose the condition that $\Sigma_j \alpha_j^2 = 1$, then minimize the length of the misfit vector, which leads to an eigenvalue problem that can be solved by singular value decomposition. Computationally this traditional approach is slow and thus is not suitable for real time processing.

Different from the traditional approach, the problem can be converted into an ordinary linear least squares system by normalizing by one of the coefficients. Dividing through by $\alpha_6$ is symmetric, but there is a class of ellipses which pass through the origin where the coefficient $\alpha_6$ is 0. This can be achieved if the photo-detector outputs have constant electrical offsets. This will lead to singular equations for the coefficients. An unsymmetrical alternative is $$c_1 + c_2 y^2 + c_3 xy + c_4 x + c_5 y = x^2 \quad (12)$$

where $c_j = \alpha_6/\alpha_1$, $c_2 = -\alpha_2/\alpha_1$, etc. Were $\alpha_1$ to vanish, the data trace would become a straight line, which should never occur during proper operation of the system. Thus Eq. (12) can be used in place of Eq. (11). Measured values of x and y are inserted into Eq. (12) and the unknowns $c_j$ are found by solution of the over-determined linear least squares system via the stable QR algorithm as described by, e.g., Lawson and Hanson in "Solving Least Square Problems," Prentice-Hall, Englewood Cliffs (1974).

During operation of the system, a recent collection of x-y data pairs is used to solve Eq. (12) for five ellipse coefficients $c_1$ to $c_5$ for an ellipse in non-parametric form in Eq. (10).

To compute the phase p in real-time for each new x-y observation, however, the ellipse coefficients in parametric form are needed (a, b, $x_o$, $y_o$, and $p_o$). To recover these five unknowns from the least-squares-derived coefficients $c_1$ to $c_5$, we rewrite (10) exactly in the form of (12):

$$a^2 \alpha_6 - \left(\frac{a}{b}\right)^2 y^2 + 2\left(\frac{a}{b}\right) \sin p_0 xy + \quad (13)$$
$$2\left[x_0 - y_0\left(\frac{a}{b}\right)\sin p_0\right]x + 2\left[y_0\left(\frac{a}{b}\right)^2 - x_0\left(\frac{a}{b}\right)\sin p_0\right]y = x^2$$

where $\alpha_6$ is the right side of Eq. (10). Identifying coefficients of $y^2$ and xy in Eqs. (12) and (13), and defining the ratio of the two signal amplitudes as r, the following can be found:

$$r = a/b = \sqrt{-c_2} \quad (14)$$

$$\sin p_0 = \frac{c_3}{2r} \quad (15)$$

Then from the x and y coefficients, the following can be derived for $x_o$ and $y_o$:

$$x_0 - r\sin p_0 y_0 = \frac{c_4}{2}, \quad -r\sin p_0 x_0 + r^2 y_0 = \frac{c_5}{2} \quad (16)$$

which can be solved to yield:

$$y_0 = \frac{rc_4 \sin p_0 + c_5}{2r^2 \cos^2 p_0} \quad (17)$$

$$x_0 = \frac{c_4}{2} + y_0 r \sin p_0 \quad (18)$$

Accordingly, the following can be derived:

$$c_1 = a^2 \cos^2 p_o - [x_0^2 + r^2 y_0^2 - 2x_0 y_0 r \sin p_0] \quad (19)$$

$$a = \frac{\sqrt{c_1 + x_0^2 + r^2 y_0^2 - 2x_0 y_0 r \sin p_0}}{\cos p_0} \quad (20)$$

where b=a/r.

The phase of the point on the ellipse is calculated as before by means of Eqs. (1) and (2):

$$\cos p = \frac{y - y_0}{b}, \quad \sin p = \frac{x - x_0}{a \cos p_0} - \cos p \tan p_0 \quad (21)$$

Finally, p is evaluated using the ATAN2 function. Wraps of the phase (changes by $2\pi$) is monitored and accounted for by examining successive differences.

The details of the DSP algorithm in one implementation are as follows. A 12-bit multi-channel analog-to-digital converter is interfaced directly to a DSP (BittWare models BITSI-DAQ and BTCP-4062-3). The two quadrature analog fringe signals are sampled at 100 kHz (this limits the maximum velocity of the retroreflector in FIG. 2A to 15 mm/s for a 633-nm laser). The x-y samples are passed to a DSP which immediately converts the samples into floating point phase values via Eq. (21). Adjacent samples are monitored to account for phase wraps. Transitions across zero phase are appropriately adjusted by a value of $\pm\pi$, rendering the dynamic range of the system to be limited only by the floating-point range of the processor. The photodetector output is of finite dynamic range; if the full range of the A/D converters is used, the single-sample phase resolution can be shown to be $1/2^{N-1}$, where N is the number of bits in the digitizer. In our experiments, N=12, corresponding to a least count in phase of about ½ milliradian. The samples are low pass filtered and decimated to a final recorded sample rate of 200 Hz. This is accomplished with a three stage multirate filter which limits the computational load on the DSP. Assuming a coherent noise reduction, the final phase resolution for signals less than the Nyquist frequency is ½ milliradian $500^{1/2} \approx 22$ microradian.

In addition to producing the displacement signal, the DSP performs the ellipse fitting outlined above. Each second, an x-y sample is inserted into a 500 point circular buffer and a new least-squares solution to Eq. (12) is computed. The fitting routine thus tracks parameter changes with time scales of the order of 8 minutes. In the algorithm tested, the rate and the time-span of points used to update the ellipse are adjustable.

Figure 5:
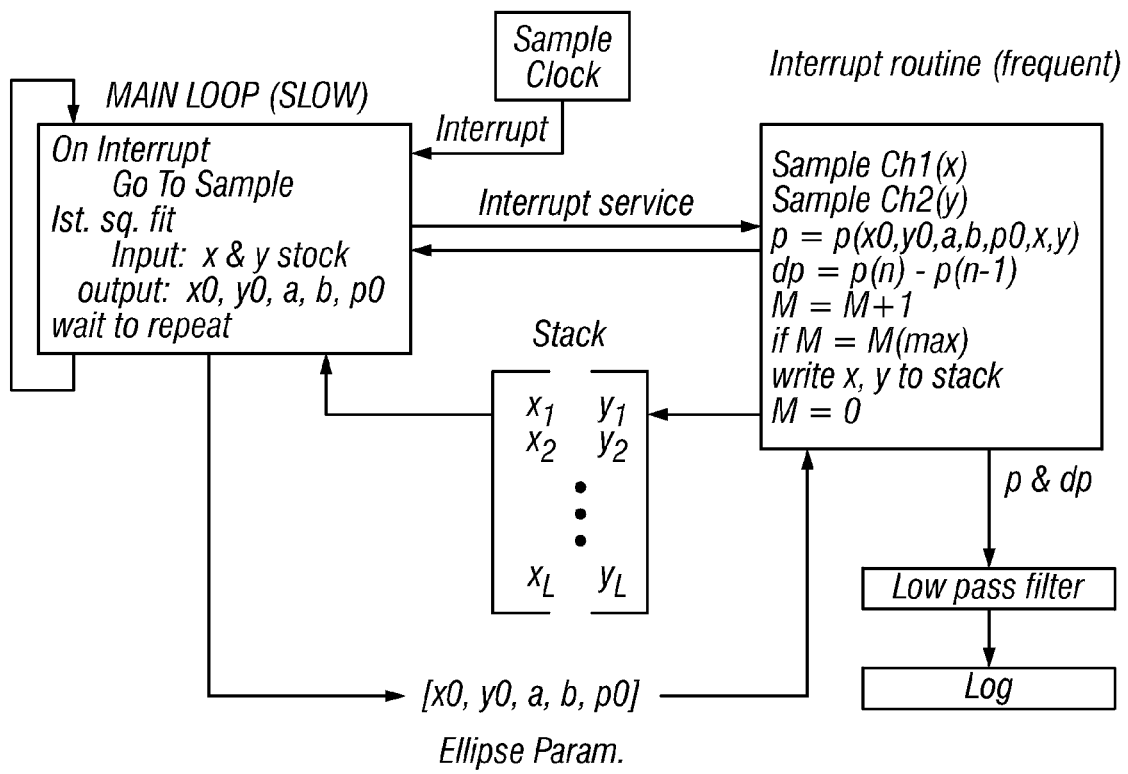
FIG. 5 illustrates an example of the processing within the digital signal processor in FIG. 1.

FIG. 5 illustrates an example of the processing within the digital signal processor in FIG. 1. In one implementation, the processor may include an electronic unit with two analog inputs that creates internet-readable, time tagged, decimated and filtered pressure data. A combination Digital Signal Processor (DSP) board and fast Analog-to-Digital (A/D) conversion board in a PC-104 form-factor, for example, may be used to achieve this. The samples are low pass filtered and decimated to a final recorded sample rate. This filtering may be accomplished with a three stage multirate filter which limits the computational load on the DSP.

Figure 6:
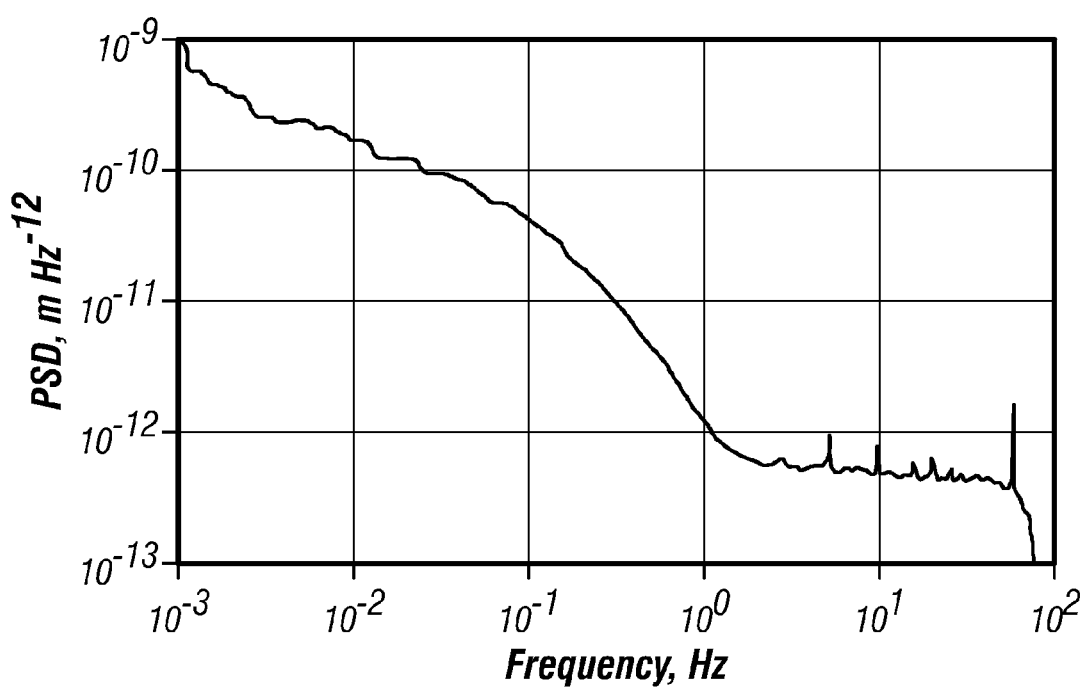
FIG. 6 illustrates a measured power spectral density of the displacement record from the DSP processing for an equal arm, free-space Michelson interferometer illuminated with a 0.5 mW HeNe laser.

As an example of our first test of the system, we monitored a Michelson interferometer as in FIG. 2A. For this experiment, we first modulated the optical path by vibrating one of the corner-cube reflectors with a PZT to establish the ellipse parameters. Then we fixed the ellipse parameters by disabling the fitting routine and recorded data for a duration of 7 hours. The equal-arm interferometer was held in a partial vacuum and illuminated with a 0.5 mW polarization stabilized laser (Micro-g model ML-1). The power pectral density of the displacement is shown in FIG. 6. During measurements, optical corner-cubes and beamsplitter were attached to a small fixture held in a partial vacuum. For seven hours, data were sampled at 200 samples per second. To display this clearly, the spectrum in FIG. 6 has been smoothed below 1 Hz into approximately ⅓ octave bands. Above 1 Hz, the spectrum has been smoothed with a fixed 0.75 Hz Gaussian window. The noise increases with period (presumably from temperature fluctuations). The noise floor of $5 \times 10^{-13}$ m $Hz^{-1/2}$ is about 23 dB above the theoretical limit, probably because of electronic noise in the detectors. Depending on assumptions regarding losses, imperfections, and mis-alignment, the shot noise limit is about $10^{-13}$ m $Hz^{-1/2}$. The peaks in the spectrum are believed to be artifacts of noise on the digitizer board caused by interactions with the host computer. The present signal processing scheme provides an interferometric displacement transducer with the combination of high sensitivity and wide dynamic range. A prototype interferometer was tested to have a dynamic range of at least several centimeters and a sensitivity of less than a picometer.

Only a few implementations are described. Other variations, modifications, and enhancements are possible based on what is described here.

What is claimed is:

1. A method, comprising:
   obtaining two quadrature fringe signals from an interferometer which causes two signals in two signal paths to interfere with each other;
   sampling the two quadrature fringe signals to obtain digital data samples from the two quadrature fringe signals;
   using a plurality of the digital data samples to perform a linear least square fitting to establish coefficients for an ellipse traced by the two quadrature fringe signals as a phase difference between the two signal paths changes; and
   using a pair of digital data samples respectively obtained from the two quadrature signals at a given moment to compute a corresponding phase difference between the two signal paths of the interferometer from established coefficients of the ellipse.

2. The method as in claim 1, further comprising:
   adding new digital data samples to the linear least square fitting to update the coefficient for the ellipse.

3. The method as in claim 2, wherein a new pair of digital data samples respectively obtained from the two quadrature signals is periodically added for the linear least square fitting to update the coefficients for the ellipse.

4. The method as in claim 3, further comprising changing the time duration over which the coefficients for the ellipse are updated.

5. The method as in claim 1, further comprising monitoring adjacent digital data samples obtained from the two quadrature fringe signals to account for a change in phase by $2\pi$.

6. The method as in claim 1, further comprising adjusting each transition across a phase value of zero in the digital data samples by a value of either +180 degrees or −180 degrees to achieve a wide dynamic range.

7. The method as in claim 1, further comprising using an optical interferometer as the interferometer.

8. A device, comprising:
   an optical interferometer to produce two quadrature fringe signals from optical interference of two optical signals of two optical paths; and
   a digital signal processor to use a plurality of the digital data samples to perform a linear least square fitting to establish coefficients in a nonparametric equation for an ellipse traced by the two quadrature fringe signals as a phase difference between the two optical paths changes, wherein the digital signal processor operates to use a pair of digital data samples respectively obtained from the two quadrature signals at a given moment to compute a corresponding phase difference between the two optical paths from established coefficients of the ellipse.

9. The device as in claim 8, wherein the optical interferometer comprises a Michaelson interferometer.

10. The device as in claim 8, wherein the optical interferometer comprises a Mach-Zehnder interferometer.

11. The device as in claim 8, wherein the digital signal processor adds new digital data samples to the linear least square fitting to update the coefficient for the ellipse.

12. The device as in claim 8, wherein the digital signal processor periodically adds a new pair of digital data samples respectively obtained from the two quadrature signals for the linear least square fitting to update the coefficients for the ellipse.

13. The device as in claim 8, wherein the digital signal processor monitors adjacent digital data samples obtained from the two quadrature fringe signals to account for a change in phase by $2\pi$.

14. An apparatus, comprising:
    an interferometer to cause interference of two signals to produce an interferometer signal;
    a quadrature fringe signal generator to produce two quadrature fringe signals from the interferometer signal; and
    a digital signal processor configured to fit the two quadrature fringe signals into an ellipse according to a linear least square fitting and to extract information on a difference in signal paths of the two signals in the interferometer from information of the ellipse.

15. The apparatus as in claim 14, wherein the interferometer is an optical interferometer.

16. The apparatus as in claim 15, wherein the optical interferometer comprises a Michaelson interferometer.

17. The apparatus as in claim 15, wherein the optical interferometer comprises a Mach-Zehnder interferometer.

18. The apparatus as in claim 14, wherein the digital signal processor operates to convert samples of the quadrature fringe signals into floating point values.

19. The apparatus as in claim 18, wherein the digital signal processor operates to monitor adjacent samples of the quadrature fringe signals to account for phase wraps.

20. The apparatus as in claim 19, wherein the digital signal processor operates to adjust transitions across a phase value of zero by a value of either +180 degrees or −180 degrees to achieve a wide dynamic range.

* * * * *

UNITED STATES PATENT AND TRADEMARK OFFICE
CERTIFICATE OF CORRECTION

| | | |
|---|---|---|
| PATENT NO. | : 8,023,116 B1 | Page 1 of 1 |
| APPLICATION NO. | : 11/754963 | |
| DATED | : September 20, 2011 | |
| INVENTOR(S) | : Zumberge et al. | |

It is certified that error appears in the above-identified patent and that said Letters Patent is hereby corrected as shown below:

At column 1, line 23, please delete the entire paragraph and insert the following amended paragraph:

--This invention was made with government support under contract DTRA01-99-C-0056 awarded by the Defense Threat Reduction Agency. The government has certain rights in the invention.--

Signed and Sealed this
Twenty-seventh Day of March, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,023,116 B1 | Page 1 of 1 |
| APPLICATION NO. | : 11/754963 | |
| DATED | : September 20, 2011 | |
| INVENTOR(S) | : Zumberge et al. | |

It is certified that error appears in the above-identified patent and that said Letters Patent is hereby corrected as shown below:

Column 10, line 12, in Claim 9, delete "Michaelson" and insert -- Michelson --.

Column 10, line 41, in Claim 16, delete "Michaelson" and insert -- Michelson --.

Signed and Sealed this
Twenty-ninth Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,023,116 B1 | |
| APPLICATION NO. | : 11/754963 | |
| DATED | : September 20, 2011 | |
| INVENTOR(S) | : Mark A. Zumberge et al. | |

It is certified that error appears in the above-identified patent and that said Letters Patent is hereby corrected as shown below:

In the Specifications:

In Column 5, Line 6, please delete "$\pi/8$" and insert -- $\lambda/8$ --, therefor.

Signed and Sealed this
Twenty-seventh Day of November, 2012

David J. Kappos
*Director of the United States Patent and Trademark Office*